United States Patent
Alvarez, Jr. et al.

(10) Patent No.: US 7,381,243 B2
(45) Date of Patent: Jun. 3, 2008

(54) METHOD FOR PURIFYING CARBON DIOXIDE

(75) Inventors: Daniel Alvarez, Jr., San Diego, CA (US); Jeffrey J. Spiegelman, San Diego, CA (US); Russell J. Holmes, Santee, CA (US)

(73) Assignee: Entegris, Inc., Chaska, MN (US)

( * ) Notice: Subject to any disclaimer, the term of this patent is extended or adjusted under 35 U.S.C. 154(b) by 329 days.

(21) Appl. No.: 10/531,512

(22) PCT Filed: Oct. 16, 2003

(86) PCT No.: PCT/US03/33006

§ 371 (c)(1),
(2), (4) Date: Jun. 21, 2005

(87) PCT Pub. No.: WO2004/035178

PCT Pub. Date: Apr. 29, 2004

(65) Prior Publication Data

US 2005/0265912 A1    Dec. 1, 2005

Related U.S. Application Data

(60) Provisional application No. 60/419,390, filed on Oct. 17, 2002.

(51) Int. Cl.
*C01B 31/20* (2006.01)
*B01J 20/06* (2006.01)
*B01D 53/04* (2006.01)

(52) U.S. Cl. ...................................... 95/116

(58) Field of Classification Search .............. 95/90, 95/116, 117, 128, 129, 133, 134, 135, 140, 95/141; 96/108; 423/210, 437.1

See application file for complete search history.

(56) References Cited

U.S. PATENT DOCUMENTS

| 4,871,710 | A | * | 10/1989 | Denny et al. | 502/414 |
| 4,888,157 | A | * | 12/1989 | Carnell et al. | 423/230 |
| 5,186,727 | A | * | 2/1993 | Chang | 95/117 |
| 5,244,641 | A | * | 9/1993 | Khare | 423/220 |
| 6,537,514 | B1 | * | 3/2003 | Prasad et al. | 423/437.1 |
| 6,764,535 | B1 | * | 7/2004 | Lansbarkis et al. | 96/132 |
| 2002/0041842 | A1 | | 4/2002 | Ruettinger et al. | |
| 2004/0076575 | A1 | * | 4/2004 | Alvarez et al. | 423/437.1 |

FOREIGN PATENT DOCUMENTS

EP    0698577 A1    2/1996
EP    0952111 A1    10/1999

* cited by examiner

*Primary Examiner*—Frank M Lawrence
(74) *Attorney, Agent, or Firm*—Hamilton, Brook, Smith & Reynolds, P.C.

(57) ABSTRACT

The invention is a method for the decontamination of $CO_2$ to a sufficient level of purity to allow it to be used in the semiconductor industry. The invention comprises the exposure of fluid $CO_2$ to a combination metallic states of at least one metal under the appropriate conditions for removal of contaminants. The adsorbents are then decontaminated/activated to return the adsorbent to a mixed oxidation state and allow further rounds of decontamination. The adsorbents are selected to be complimentary to each other, preferentially adsorbing different contaminants. Additionally, the adsorbents are selected to undergo reduction differently such that upon regeneration only a portion of the metals are reduced and the adsorbent is returned essentially to its original state.

23 Claims, 1 Drawing Sheet

METHOD FOR PURIFYING CARBON DIOXIDE

CROSS-REFERENCES TO RELATED APPLICATIONS

This application is the U.S. National Stage of International Application No. PCT/US03/33006, filed 16 Oct. 2003, published in English, and claims the benefit of U.S. Provisional Application No. 60/419,390, filed Oct. 17, 2002 and is related to U.S. patent Ser. No. 10/273,810, filed Oct. 17, 2002 entitled "METHOD OF RESTRICTED CARBON DIOXIDE PURIFICATION", all of which are incorporated herein by reference in their entirety.

BACKGROUND OF THE INVENTION

Carbon dioxide ($CO_2$) is used in a wide variety of industrial processes and products from the carbonation of beverages to the generation of semiconductors. Industrial applications for $CO_2$ include wafer cleaning, removal of residual photoresist, low K dielectric annealing and cleaning, use as laser gases, particle removal and plasma generation. The presence of contaminants in such ultrahigh purity applications can result in products that are unusable in the case of semiconductor applications or the damage of optics and lasers in other relevant applications. Various phases of $CO_2$, liquid, gas and supercritical, are used dependent upon the application.

Purification of $CO_2$ to a high level is difficult as $CO_2$ is inherently wet. Gases can be readily acquired that are $\geq 99.999\%$ pure (contaminants $\leq 10$ parts per million, ppm; Ultra High Purity); however, there is a need to further purify gases to $\leq 5$ parts per billion (ppb) contaminants to meet the current Semiconductor Industry Association guidelines. Future requirements will be for contaminants of $\leq 1$ ppb, preferably $\leq 0.1$ ppb. Contaminants of concern to the semiconductor industry include moisture, hydrocarbons, particulates and metals. Other contaminants include oxygen-, nitrogen-, sulphur- and phosphorus-containing compounds such as $O_2$, $NO_x$, $SO_x$, COS, and $PO_x$, wherein $x \leq 3$, and corresponding organoheteroatom derivatives wherein heteroatoms include, but are not limited to, oxygen, nitrogen, sulphur, phosphate and silicon.

Purification of $CO_2$ to a high level is even more essential when it is used in the supercritical state. A supercritical fluid is a fluid which is in a state above its critical temperature and critical pressure where the gas and liquid phases resolve into a single medium, in which density can vary widely without a phase transition. This allows, for instance, for substances that normally act as solvents primarily for inorganic or polar substances to also become efficient solvents for organic or non-polar materials. The supercritical state of $CO_2$ can be reached under relatively moderate conditions at a critical point of 31.3° C., (88.3° F.) and 74 barr (1070 psi).

Supercritical $CO_2$ is useful as a cleaning agent because it is able to enter small features on surfaces and porous interior surfaces to remove contaminants, etched photoresist and other undesirable materials from substrates. However, this property can also result in impregnation of wafers and other high purity substrates with contaminants present in the $CO_2$ stream. Additionally, the high pressure and temperature of the fluid can result in some contaminants becoming more nefarious. For example, water and oxygen in the context of supercritical $CO_2$ can become highly corrosive, whereby desired structural features on wafers are subject to degradation.

Equipment used in the semiconductor industry can also act as a source of contaminants. Stainless steel components can leach metals including iron, chromium and nickel as metal complexes or metal ions. Leached metals are volatile at low concentrations, ppb to parts per trillion (ppt), and are readily captured in the gas phase resulting in potential contamination of silicon wafers or other high purity products. Therefore, all equipment for use in the semiconductor manufacturing process must be thoroughly cleaned to remove potential surface contaminants.

Spiegelman et al (U.S. Pat. No. 6,361,696, incorporated herein by reference) teach the use of high silica zeolites for the continuous purification of $CO_2$ in a dual bed apparatus. Although the high silica zeolites are able to remove heavy hydrocarbons from $CO_2$ efficiently, removal of other contaminants is limited. Lansbarkis et al. (U.S. Pat. No. 6,511,528) teach the use of a series of materials to remove a series of contaminants from $CO_2$ to all for its use in the semiconductor industry. The materials may be placed in a single or multiple containers. Either arrangement results in a complex system. If the materials are placed in a single container, the container must be discarded upon the breakdown of the least stable purification material. If multiple containers are used, complex replacement schedules must be followed to ensure the overall purity of the $CO_2$.

SUMMARY OF THE INVENTION

The invention pertains to a method for the purification of $CO_2$ to achieve sufficient purity for its use in the semiconductor industry. The method comprises contacting the $CO_2$ stream, gas, liquid or supercritical fluid, with a quantity of at least one mixed metal oxide wherein the mixed metal oxide comprises at least two oxidation states of one or more metals; or two metals with similar relatively high oxidation states with different chemical properties. The invention comprises the use of a single mixture of materials to achieve low levels of a number of contaminants Decontamination of the $CO_2$ can take place in any of a number of purification apparatuses including both bed and canister apparatuses. The contaminants of primary concern are $O_2$, water, metals, sulfurous contaminants, especially COS, phosphorus containing contaminants, silicon containing contaminants, and non-methane hydrocarbons (NMHC). Contaminants of secondary concern are nitrogenous contaminants, especially $NH_3$ and $NO_x$, wherein $1 \leq x \leq 2$ and other inorganic compounds. Total contaminant levels are reduced to less than 100 ppb using the method of the invention.

The invention allows for removal of a broad range of contaminants from the $CO_2$. Oxidizable contaminants are absorbed on the high oxidation state portion of the material and reducible contaminants are adsorbed on the low oxidation state portion of the material. The selection and ratios of metals is dependent upon the source of $CO_2$ to be decontaminated in conjunction with the contaminants to be removed.

The invention further pertains to methods for the activation and regeneration of the metal oxides to provide adsorbents with multiple oxidation states to allow for sequestration of a variety of contaminants. Activation and regeneration comprise exposure of the adsorbent to oxygen at a relatively high temperature for a period of time to nearly fully oxidize the metals. The adsorbents are then cooled and exposed to a reducing agent, such as 1-5% hydrogen ($H_2$) in an inert gas such as nitrogen ($N_2$) or argon (Ar) for a sufficient period of time to partially reduce the adsorbent. In addition to producing a mixed metal oxide, the activation and regeneration steps purge contaminants from the adsorbents. Exact methods for activation and regeneration depend on the type of beds, the adsorbents used and the major contaminants in the $CO_2$.

DETAILED DESCRIPTION AND PREFERRED EMBODIMENTS

Figure 1:
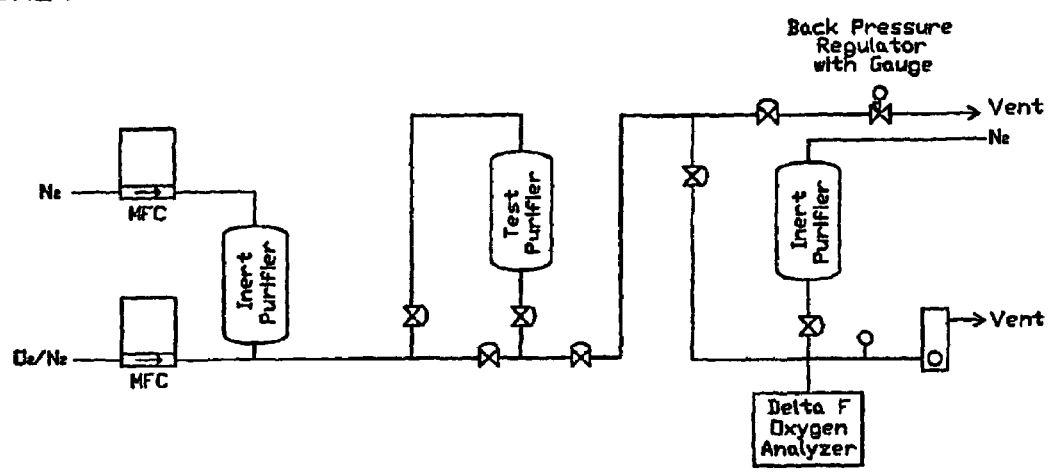
FIG. 1 is an $O_2$ removal test manifold.

The invention is a method for the production of highly purified $CO_2$ containing contaminants at less than 100 ppb, preferably less than 10 ppb, most preferably less than 1 ppb, for use in the semiconductor industry. Contaminants of primary concern are $O_2$, water, metals, sulfurous contaminants, especially COS, phosphorus- and silicon-containing contaminants and non-methane hydrocarbons (NMHC). Contaminants of secondary concern are nitrogenous compounds, especially $NH_3$ and $NO_x$ and other organic compounds.

Purification of $CO_2$ is exceptionally difficult as it typically reacts with most adsorbent materials (e.g., metal oxides) and render them inactive. In fact, $CO_2$ is commonly used to passivate highly active reduced metals prior to shipping for safety purposes. The instant invention overcomes the repressive nature of $CO_2$ with mixed-metal combinations where disparate chemical properties are exploited by proper choice of activation processes that are further described below.

The invention comprises the use of at least one metal in multiple oxidation states as adsorbents. Multiple oxidation states are defined as:

$$M^o + M^n \text{ wherein } 1 \leq n \leq 8 \text{ and M is a metal}$$

The adsorbents combine properties of both high and low oxidation state metals. In the context of the instant invention a mixed metal oxide is defined as a composition containing at least one metal in multiple oxidation states or two or more metals with disparate chemical properties, such as electronegativities or coordination environments, in similar relatively high oxidation states. In the context of the instant invention, one of the components of the mixed metal oxide can be in the metallic state (e.g., Ni/NiO). A number of examples are presented that exemplify combinations of the mixed metal oxides of the instant invention. Although mechanisms of action are suggested for a number of materials, the invention is not bound by the proposed mechanisms and they are not limitations of the invention.

First, two or more metals in different oxidation states can be combined (e.g. Cu/ZnO, Fe/$MnO_x$). Second, two or more metals in similar oxidation states with sufficiently different properties can be combined (e.g. NiO/$TiO_x$, PdO/$CeO_x$). Third, a single metal which has oxidation states that vary throughout the metal can be used (e.g. Ni/NiO, $V_yO_x$ wherein $1 \leq y \leq 5$). The possible value of x varies depending on the compound and may or may not be a whole number. One skilled in the art would know the possible values for x in each case. Considerations for selecting the appropriate adsorbent or adsorbents are discussed below.

The materials of the instant invention are stable and their adsorption properties are not rendered ineffective by exposure to liquid and supercritical $CO_2$ which has substantial solvent properties. Additionally, standard purification conditions including pressures up to at least about 10,000 psi and temperatures up to at least about 60° C. should not alter the stability or adsorbtion properties of the materials of the instant invention. The stability of the materials is demonstrated by maintaining the desired level of decontamination of $CO_2$ for a time period of at least six months.

The materials of the instant invention may be prepared separately and mixed before loading into the purifier canister or bed. The materials can be an intimately co-mingled mixture prepared by impregnation, co-precipitation, sublimation or other relevant techniques. The materials may be supported on or mixed with an inorganic oxide including, but not limited to, silica, aluminum or zeolites for increased surface area, greater structural integrity, improved flow rate, or to accommodate other physical and mechanical considerations. Supports may also assist in the purification, especially in the removal of water. In a preferred embodiment, the adsorbent has a surface area of at least 50 $m^2/g$, should be able to withstand the high pressure associated with all three fluid phases of $CO_2$ and should not become entrained in the fluid stream or introduce additional contaminants into the fluid stream. The surface area of the material should take into consideration both the interior and exterior surfaces that are characteristic of adsorbents that are typically highly porous. The use of co-mingled (i.e. intimately mixed) adsorbents allows for the removal of a variety of contaminants in a single step rather than having to perform multiple steps of decontamination through different beds or containers.

A variety of purification apparatuses are known including, but not limited to canister and multiple and single bed apparatuses. In a preferred embodiment, the method of the invention is carried out using a dual bed apparatus. Purification comprises contacting the adsorbent material with the $CO_2$ stream for sufficient time to allow decontamination to the desired level. Decontamination considerations such as time, pressure, flow rate and temperature may be readily determined by those skilled in the art and are typically considered on a case by case basis for each adsorbent.

Decontamination of $CO_2$ is alternated with regeneration of the adsorbent material. This cycle is preferably repeated multiple times to minimize the unit cost of $CO_2$ purification. Frequency and duration of regeneration of the adsorbent material varies depending on the size of the adsorbent surface area, the level of contamination of the gas source and a number of other factors well known to those skilled in the art. Regeneration involves oxidation to prepare the material for adsorption of sulfurous and other contaminants and reduction to prepare the material for oxygen adsorption. The exact process of regeneration is dependent upon the adsorbents used and the contaminants that were removed from the $CO_2$. Such considerations are discussed below.

Activation and regeneration of adsorbents to obtain a mixed oxidation state is an important aspect of the instant invention. Regeneration rather than replacement of the adsorbents decreases cost and facilitates the use of the method of the invention. As combinations of metals and metallic states are selected to have various decontamination properties, they are also selected to have different activation/regeneration properties to allow for all of the contaminants to be purged from the adsorbent using heat or cooling in combination with oxygen, followed by reduction under specific conditions to allow only a portion of the adsorbent to undergo reduction.

An example of an activation/regeneration protocol is to first contact the material with an oxidant regeneration gas (e.g. $O_2$, air, $O_2$/$CO_2$ mixture, $O_2$/inert gas mixture) for a sufficient time and a sufficient temperature to effect removal of all oxidizable contaminants. This oxidative step is performed at a relatively high temperature, about 300-550° C., preferably about 400° C. for about 12-24 hours. After oxidation, the adsorbent is cooled to about 100-250° C. and exposed to a reducing gas containing about 1-5% $H_2$ in an inert gas such as $N_2$ or Ar or an $H_2/CO_2$ mixture for sufficient time, typically about 12-24 hours, to result in a partial reduction of the material such that a mixed oxidation state is obtained. In a preferred embodiment, the regeneration and purge gases are both $CO_2$ based, i.e. $O_2/CO_2$ mixture for oxidation and $H_2/CO_2$ mixture for reduction.

The adsorbents and processes of the instant invention can effectively reduce the level of contaminants in $CO_2$. While we do not wish to be bound by any particular theory of chemical mechanism underlying the process of the invention, we believe that the following reactions are significant in the process.

In a first embodiment of the instant invention, the adsorbent may contain two or more metals present in different oxidation states. Cu/ZnO and Fe/MnO$_x$ are exemplary of such a combination. Preferred materials are those in which the higher oxidation-state portion of the material is reactive towards certain contaminants (e.g. by removing COS in a metathesis reaction that generates $CO_2$), while the lower oxidation-state portion of the material is reactive towards certain other contaminants (e.g. by absorbing oxygen, hydrogen, or carbon monoxide). Although such reactions are known to occur in the presence of inert gas, the reactions are surprising in the presence of $CO_2$. Particularly advantageous materials are those in which oxygen readily binds to an oxygen deficient portion of the material (e.g. for kinetic reasons), then diffuses into a co-mingled portion of the material which preferentially binds oxygen (e.g. for thermodynamic reasons). The ratios of the adsorbents to each other can be widely varied depending on the contaminants to be removed as well as other parameters known to those skilled in the art.

Cu/ZnO is known to exist as a combination of metallic copper and zinc oxide with Cu present in a substantially reduced state. The material may be supported on an inorganic oxide such as aluminum oxide as described above. ZnO is stable fully oxidized $Zn^{II}$ and metal oxides adsorb NMHCs. Reactions can proceed as follows during the $CO_2$ purification method:

$$Cu^0 + \tfrac{1}{2}O_2 \rightarrow CuO$$

$$ZnO + COS \rightarrow ZnS + CO_2$$

$$MO_x + NMHC \rightarrow (MO_x.NMHC)$$

Thus, NMHCs are removed from the $CO_2$ stream. Cu/ZnO has been demonstrated to remove $O_2$, $SO_2$, COS, toluene and water from $CO_2$.

Similar reactions are possible using Fe/MnO$_x$, a material which has the properties of a substantially metallic iron mixed with iron and manganese oxides in widely varying oxidation states. Oxygen-deficient Fe reacts with $O_2$ and Fe and manganese oxides remove sulfur containing contaminants from the $CO_2$ stream.

$$2FeO + \tfrac{1}{2}O_2 \rightarrow Fe_2O_3$$

$$MO_x + COS \rightarrow MSO_{x-1} + CO_2$$

The combination of Fe/MnO is ideal for the removal of non-methane hydrocarbons (NMHC) and is particularly suited for the migration of chemisorbed oxygen and sulfur from Fe into bulk Mn oxide. MnO$_2$/Fe has been demonstrated to remove COS from both liquid and gas $CO_2$.

In a second embodiment of the invention, the adsorbent may contain two or more metals present in similar relatively high oxidation states for the corresponding metals, but in which the two metals vary considerably in chemical properties. NiO/TiOx and PdO/CeO$_x$ are exemplary of such combinations. The aforementioned adsorption properties are still relevant to this material, wherein two portions of the material have different, complementary adsorption properties (e.g., different coordination environments). Coordination environments are the electronic environments about a metal that yields preferences in coordination number and ligand type. Rather than the different adsorption tasks being accomplished by similar metals with an oxidation state differential, different portions of the material are in similar relatively high oxidation states. The different adsorption properties come from the presence of vastly different metals. An example is a mixture of a late transition metal oxide with an early transition metal oxide. As in the previous case, especially advantageous materials are those that undergo a degree of self-regeneration by diffusion of contaminants adsorbed in one portion of the material into another portion of the material. Again, although such reactions are known to occur in the presence of inert gas, the reactions are surprising in the presence of $CO_2$. The ratios of the adsorbents to each other can be widely varied depending on the contaminants to be removed as well as other parameters known to those skilled in the art.

TiO$_x$ may have oxygen vacancies or be able to adsorb oxygen on exposed metallic active sites. Reactions can proceed as follows during the $CO_2$ purification method:

$$TiO_x + \tfrac{1}{2}O_2 \rightarrow TiO_{x+1}$$

$$Ti^*O_x + O_2 \rightarrow [TiOx.O_2],$$

wherein * indicates the Ti is in a metal complex. This form may involve bridging dioxygen acting as a ligand rather than undergoing a redox reaction on a partially reduced titania surface.

NiO also may be completely or partially reduced to Ni$^0$, in which case redox chemistry may take place involving the Ni-containing portions of the material. Additionally, the NiO may participate in sulfur scavenging as shown in the following reactions:

$$NiO + COS \rightarrow NiS + CO_2$$

Nickel sulfides/oxides are known to undergo further disproportionation reactions such as the reaction shown below:

$$xNiO + NiS \rightarrow Ni(SO_x) + xNi^0$$

which may generate additional reduced nickel active sites.

$$NiO + NMHC \rightarrow (NiO.NMHC)$$

The various oxidation states of the oxygen-deficient oxides of CeO$_x$ are well-known and their reactivity is believed to be similar to TiO$_x$ and TiO$_2$ as shown above. The behaviors of Pd and PdO are well known on ceria and they display reactivity towards various contaminants in a manner similar to Ni which is in the same periodic group. The combinations of materials in this example function similarly to those of the previous example by providing different reactivities resulting in different adsorption and regeneration properties. Ni/NiO has been demonstrated to remove a wide variety of contaminants from $CO_2$ including water, $O_2$, metals including nickel, aluminum, iron, chromium, zinc and magnesium; sulfur-containing compounds, and a number NMHCs both large and small.

In a third embodiment of the invention, the adsorbent may contain a single metal oxide in which the metal oxidation state varies throughout the metal. $V_yO_x$ exists in a number of oxidation states and is exemplary of such a metal. The aforementioned adsorption properties are still relevant to this material, wherein two portions of the material have different, complimentary adsorption properties (i.e. different oxidation states). The same metal present in different oxidation states within the material accomplishes the different adsorption tasks. For example, a low oxidation state portion of the material may adsorb oxygen, while a higher oxidation state portion may preferentially adsorb NMHCs or sulfurous contaminants.

Vanadia based materials in which vanadium is present in several incremental oxidation states are known. For example:

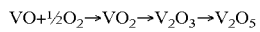

Vanadium sulfides, analogous to the vanadium oxides, are also possible. The electropositive surface of vanadia is similar to titania, but with different oxidation characteristics, allowing the reaction:

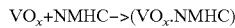

for the adsorption of NMHCs.

The level of oxidation of vanadium can be controlled during the regeneration process of the invention.

Iron is known to have a number of oxidation states from zero to +4 and may exist in a number of oxidation states similar to vanadium. $Fe_xO_y$ has been shown to remove a number of contaminants including toluene, $H_2S$, COS, benzene, acetaldehyde and water.

All references set forth herein are incorporated by reference in their entirety. All percentages are by weight unless otherwise provided. Parts of contaminants that are parts by volume.

EXAMPLE

A test purifier was filled with a adsorption media containing a including a pre-oxidized mixture of Ni/NiO, approximately 60% by weight on an a silica support, exposed to air for several days. The purifier was activated for 29 hours at ambient temperature using a 5% $H_2$/95% Ar purge gas at 1 standard liter/minute (slm) at 0 pounds/square inch gauge (psig). Afterwards, the purifier was purged with gaseous $CO_2$ purified with an Aeronex SS-500-KF-A-4R purifier. The temperature was monitored to indicate when each media was finished reacting with the $CO_2$.

Figure 2:
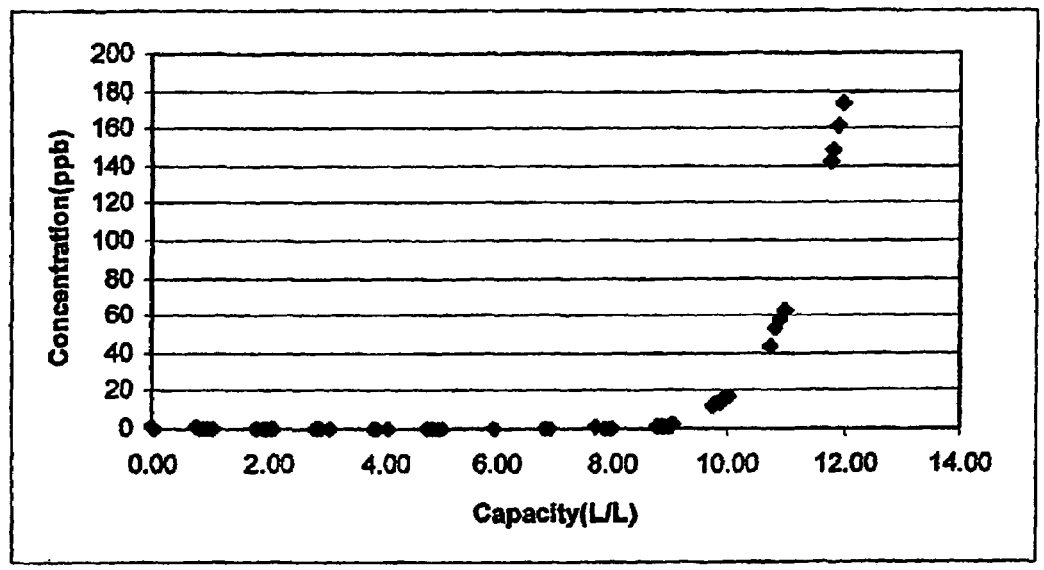
FIG. 2 is a graph of the oxygen removal capacity of the Ni/NiO media of the invention.

FIG. 1 represents the experimental setup. Mass flow controllers (MFCs) were used to maintain the flow rates of the 944 ppm $O_2$ standard and the purified nitrogen ($N_2$) to attain a challenge gas containing 15 ppm of $O_2$. A back-pressure regulator was used to vent and maintain the pressure during purging of the test manifold. A Nanotrace Oxygen Analyzer (Delta-F) was used to measure the $O_2$ concentration. The lower detection limit of the oxygen analyzer is 0.2 ppb±0.5 ppb. The second purified $N_2$ line was used to purge the instrument. A rotameter was used to maintain the pressure of the gas flowing to the oxygen analyzer. The purifier was subjected to a challenge gas comprising 1 ppm of $O_2$ at 3 slm under 30 psig at ambient temperature. The oxygen level in the gas exiting the purifier was analyzed and the oxygen removal capacity for the media was determined as shown in FIG. 2. The capacity was shown to be between 8.10 and 8.76 liters of oxygen per liter of media (L/L) before 1 ppb breakthrough and over 11 L/L before 10 ppb breakthrough.

Although an exemplary embodiment of the invention has been described above by way of example only, it will be understood by those skilled in the field that modifications may be made to the disclosed embodiment without departing from the scope of the invention, which is defined by the appended claims.

We claim:

1. A method of removing contaminants from a stream of carbon dioxide ($CO_2$), comprising:
contacting a stream of $CO_2$ with a quantity of at least one mixed metal oxide for a period of time to reduce the contaminant content of the stream, wherein the mixed metal oxide includes: iron (Fe) and manganese oxide ($MnO_x$); nickel oxide (NiO) and titanium oxide ($TiO_x$); palladium oxide ($PdO_x$) and cerium oxide ($CeO_x$); or vanadium oxides ($VO_x$).

2. The method of claim 1, wherein the contaminant content is reduced to not more than 100 parts per billion (ppb).

3. The method of claim 1, wherein the contaminant content is reduced to not more than 10 ppb.

4. The method of claim 1, wherein the contaminant content is reduced to not more than 1 ppb.

5. The method of claim 1, wherein the mixed metal oxide includes: iron (Fe) and a manganese oxide selected from the group consisting of MnO and $MnO_2$; or vanadium oxides selected from the group consisting of VO, $VO_2$, $V_2O_3$ and $V_2O_5$.

6. A method for activation and regeneration of mixed metal oxide adsorbents for the purification of carbon dioxide ($CO_2$) comprising:
heating a mixed metal oxide adsorbent that has been used for the purification of carbon dioxide to a first temperature to release contaminants adsorbed thereto, wherein the adsorbent includes at least one mixed metal oxide, the mixed metal oxide including: iron (Fe) and manganese oxide ($MnO_x$); nickel oxide (NiO) and titanium oxide ($TiO_x$); palladium oxide ($PdO_x$) and cerium oxide ($CeO_x$); vanadium oxides ($VO_x$); nickel (Ni) and nickel oxide (NiO); or iron oxides ($Fe_xO_y$);
exposing the adsorbent to an oxidizing agent to oxidize the adsorbent;
cooling the oxidized adsorbent to a second temperature; and
exposing the cooled adsorbent to a reducing agent to produce a mixed metal oxide usable for the purification of carbon dioxide ($CO_2$).

7. The method of claim 6, wherein the first temperature is between about 300° C. to about 500° C.

8. The method of claim 7, wherein the first temperature is about 400° C.

9. The method of claim 6, wherein the oxidizing agent comprises oxygen ($O_2$).

10. The method of claim 6, wherein the second temperature is between about 100° C. to about 250° C.

11. The method of claim 6, wherein the reducing agent comprises a mixture of hydrogen ($H_2$) and an inert gas.

12. The method of claim 11, wherein the hydrogen gas comprises between about 1% to about 5% of the mixture by volume.

13. The method of claim 11, wherein the inert gas is selected from the group consisting of nitrogen ($N_2$) and argon and combinations thereof.

14. A method for Continuous purification of carbon dioxide ($CO_2$), comprising:
   a) purifying $CO_2$ by contacting a stream of $CO_2$ with a quantity of at least one mixed metal oxide for a period of time to reduce a contaminant content of the stream in a first bed of a dual bed purifier apparatus;
   b) regenerating an adsorbent in a second bed of the dual bed purifier apparatus by heating the adsorbent to a first temperature to release contaminants adsorbed thereto; exposing the adsorbent to an oxidizing agent to oxidize the adsorbent; cooling the oxidized adsorbent to a second temperature; and exposing the cooled adsorbent to a reducing agent to produce a mixed metal oxide during the coincident purification of the $CO_2$ in the previous step; followed by
   c) purifying $CO_2$ as in step a in the second bed after completion of regeneration of the adsorbent as in step b, coincident with the regeneration of the adsorbent of the first bed; and
   d) repeating steps a)-c) for continuous purification.

15. A method of removing contaminants from a stream of carbon dioxide ($CO_2$), comprising contacting a stream of $CO_2$ with a quantity of at least one mixed metal oxide for a period of time to reduce the contaminant content of the stream, wherein the mixed metal oxide includes nickel (Ni) and nickel oxide (NiO).

16. The method of claim 6, wherein the mixed metal oxide includes: iron (Fe) and manganese oxide selected from the group consisting of MnO and $MnO_2$; vandium oxides selected from the group consisting of VO, $VO_2$, $V_2O_3$ and $V_2O_5$; nickel (Ni) and nickel oxide (NiO); or FeO and $Fe_2O_3$.

17. The method of claim 16, wherein the mixed metal oxide includes nickel (Ni) and nickel oxide (NiO).

18. The method of claim 14, wherein the mixed metal oxide includes: iron (Fe) and manganese oxide ($MnO_x$); nickel oxide (NiO) and titanium oxide ($TiO_x$); palladium oxide ($PdO_x$) and cerium oxide ($CeO_x$); vanadium oxides ($VO_x$); nickel (Ni) and nickel oxide (NiO); or iron oxides ($Fe_xO_y$).

19. The method of claim 18, wherein the mixed metal oxide includes: iron (Fe) and manganese oxide selected from the group consisting of MnO and $MnO_2$; vandium oxides selected from the group consisting of VO, $VO_2$, $V_2O_3$ and $V_2O_5$; nickel (Ni) and nickel oxide (NiO); or FeO and $Fe_2O_3$.

20. The method of claim 19, wherein the mixed metal oxide includes nickel (Ni) and nickel oxide (NiO).

21. A method for activation and regeneration of a mixed metal oxide adsorbent for the purification of carbon dioxide ($CO_2$), comprising:
   heating a mixed metal oxide adsorbent that has been used for the purification of carbon dioxide to a first temperature to release contaminants adsorbed thereto;
   exposing the adsorbent to an oxidizing agent to oxidize the adsorbent;
   cooling the oxidized adsorbent to a second temperature; and
   exposing the cooled adsorbent to a reducing agent to produce a mixed metal oxide usable for the purification of carbon dioxide ($CO_2$), wherein the reducing agent comprises a mixture of hydrogen ($H_2$) and an inert gas, and wherein the hydrogen gas comprises between about 1% to about 5% of the mixture by volume.

22. The method of claim 6, wherein the adsorbent includes at least one mixed metal oxide, the mixed metal oxide including: iron (Fe) and manganese oxide ($MnO_x$); nickel oxide (NiO) and titanium oxide ($TiO_x$); palladium oxide ($PdO_x$) and cerium oxide ($CeO_x$); or vanadium oxides ($VO_x$).

23. The method of claim 14, wherein the adsorbent includes at least one mixed metal oxide, the mixed metal oxide including: iron (Fe) and manganese oxide ($MnO_x$); nickel oxide (NiO) and titanium oxide ($TiO_x$); palladium oxide ($PdO_x$) and cerium oxide ($CeO_x$); or vanadium oxides ($VO_x$).

* * * * *

UNITED STATES PATENT AND TRADEMARK OFFICE
CERTIFICATE OF CORRECTION

| | |
|---|---|
| PATENT NO. | : 7,381,243 B2 |
| APPLICATION NO. | : 10/531512 |
| DATED | : June 3, 2008 |
| INVENTOR(S) | : Daniel Alvarez, Jr., Jeffrey J. Spiegelman and Russell J. Holmes |

It is certified that error appears in the above-identified patent and that said Letters Patent is hereby corrected as shown below:

Column 8, Claim 7, Line 53 delete "500°" and replace with --550°--.

Signed and Sealed this

Fifth Day of August, 2008

JON W. DUDAS
*Director of the United States Patent and Trademark Office*